(12) United States Patent
Moore et al.

(10) Patent No.: US 7,941,756 B1
(45) Date of Patent: May 10, 2011

(54) SYSTEM AND METHOD FOR CREATING AND DISPLAYING CLASSES OF GRAPHICAL DISPLAY OBJECTS

(75) Inventors: Kenneth B. Moore, Seattle, WA (US); Christopher N. Wyman, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 1599 days.

(21) Appl. No.: 09/576,359

(22) Filed: May 22, 2000

(51) Int. Cl.
*G06F 3/048* (2006.01)
(52) U.S. Cl. .......... 715/762; 715/763; 715/764; 715/765
(58) Field of Classification Search .......... 715/762–765, 715/781, 808, 810, 826; 345/764, 762, 763, 345/765, 781, 808, 810, 826
See application file for complete search history.

(56) References Cited

U.S. PATENT DOCUMENTS

| | | | | |
|---|---|---|---|---|
| 5,588,108 A | * | 12/1996 | Kumar et al. | 345/765 |
| 5,603,034 A | * | 2/1997 | Swanson | 717/111 |
| 5,613,124 A | | 3/1997 | Atkinson et al. | 345/557 |
| 5,781,193 A | * | 7/1998 | Alimpich et al. | 345/810 |
| 5,887,193 A | * | 3/1999 | Takahashi et al. | 710/8 |
| 5,977,967 A | * | 11/1999 | Berner et al. | 345/826 |
| 5,978,811 A | | 11/1999 | Smiley | 707/103 |
| 6,005,561 A | * | 12/1999 | Hawkins et al. | 715/500.1 |
| 6,097,384 A | * | 8/2000 | Alecci et al. | 345/767 |
| 6,346,953 B1 | * | 2/2002 | Erlikh et al. | 345/762 |
| 6,538,673 B1 | * | 3/2003 | Maslow | 345/853 |
| 6,542,166 B1 | * | 4/2003 | Washington et al. | 345/762 |
| 6,628,301 B1 | * | 9/2003 | Acton et al. | 345/716 |

OTHER PUBLICATIONS

Internet web site page entitled "SONIQUE, the Ultimate Audio Player for Windows," printed Oct. 25, 2000 from httpl address skins.sonique.com.
Internet web site page entitled "Windows Media Player 7 Skins and Visualization," printed Oct. 25, 2000 from http address www.microsoft.com/Windows/windowsmedia/en/software/V7/P7Skins.asp.

* cited by examiner

*Primary Examiner* — Tadeese Hailu
(74) *Attorney, Agent, or Firm* — Aeon Law; Adam L. K. Philipp

(57) ABSTRACT

In the graphical display object system, a user can create a class of graphical display objects such that the various members of the class may share common features. In addition, the graphical display object system builds the graphical display objects based upon the common class definitions as well as the custom features of the graphical display object.

9 Claims, 6 Drawing Sheets

```
[SKIN1]
Application=RealJukebox
Version=2.0

PlayShow=1
RecordShow=0
PauseShow=0
StopShow=0
PreviousShow=0
NextShow=0
ContinueShow=0
ShuffleShow=0
MuteShow=0
VolShow=0
PosShow=0
MenuShow=0
ExitShow=0
MinimizeShow=0
RealLogoShow=0
PlayStatusShow=0
RecordStatusShow=0

PlayTopLeft=60,2

;Control 1 is a button
Control1Image=Change.bmp
Control1TopLeft=220,1
Control1IsButton=1
Control1Change Skin=<+>

;Control 2 is an image that
;identifies the skin
Control2TopLeft=110,8
Control2Image=Member1.bmp
```

```
[SKIN2]
Application=RealJukebox
Version=2.0

PlayShow=1
RecordShow=0
PauseShow=0
StopShow=0
PreviousShow=0
NextShow=0
ContinueShow=0
ShuffleShow=0
MuteShow=0
VolShow=0
PosShow=0
MenuShow=0
ExitShow=0
MinimizeShow=0
RealLogoShow=0
PlayStatusShow=0
RecordStatusShow=0

PlayTopLeft=360,2

;Control 1 is a button
Control1Image=Change.bmp
Control1TopLeft=220,1
Control1IsButton=1
Control1Change Skin=<+>

;Control 2 is an image that
;identifies the skin
Control2TopLeft=110,8
Control2Image=Member2.bmp
```

```
[SKIN3]
Application=RealJukebox
Version=2.0

PlayShow=0
RecordShow=0
PauseShow=0
StopShow=0
PreviousShow=0
NextShow=0
ContinueShow=0
ShuffleShow=0
MuteShow=0
VolShow=0
PosShow=0
MenuShow=0
ExitShow=0
MinimizeShow=0
RealLogoShow=0
PlayStatusShow=0
RecordStatusShow=0

;Control 1 is a button
Control1Image=Change.bmp
Control1TopLeft=220,1
Control1IsButton=1
Control1Change Skin=<+>

;Control 2 is an image that
;identifies the skin
Control2TopLeft=110,8
Control2Image=Member3.bmp
```

FIG. 2

```
[MAIN]
Application=RealJukebox
Version=2.0

SkinFamilyCount=3
SkinFamilyName=SampleSkin

;Only show Play Button
;  hide other controls

PlayShow=1

RecordShow=0
PauseShow=0
StopShow=0
PreviousShow=0
NextShow=0
ContinueShow=0
ShuffleShow=0
MuteShow=0
VolShow=0
PosShow=0
MenuShow=0
ExitShow=0
MinimizeShow=0
RealLogoShow=0
PlayStatusShow=0
RecordStatusShow=0

;Control 1 is a button that
;cycles through the family
members
Control1Image=Change.bmp
Control1TopLeft=220,1
Control1IsButton=1
Control1ChangeSkin=<+>

;Control 2 is an image that
;identifies the current family
member
Control2TopLeft=110,8
```

```
[SampleSkin1]
PlayTopLeft=60,2

Control2Image=Member1.bmp
```

```
[SampleSkin2]
PlayTopLeft=360,2

Control2Image=Member2.bmp
```

```
[SampleSkin3]
PlayTopLeft=0

Control2Image=Member3.bmp
```

FIG. 3

SYSTEM AND METHOD FOR CREATING AND DISPLAYING CLASSES OF GRAPHICAL DISPLAY OBJECTS

FIELD OF THE INVENTION

The system and method of the present invention relate generally to the field of creating and displaying classes of graphical display objects.

DESCRIPTION OF THE RELATED ART

The increased use of computer software has led to the creation of graphical display objects that allow users to customize the look of a running software module. For example, the RealNetworks® RealJukebox® program allows the user to customize the look of the RealJukebox® program through the use of Skins.

Users create their own graphical display objects by defining objects, such as buttons, graphics, and menus, that will appear in the graphical display. These definitions may include, for example, the location of the object, the color of the object, the size of the object, and the corresponding graphics file.

One common problem with conventional approaches is that the creation of the graphical display objects is a very time consuming task as the user has to define each element that will appear in the graphical display object.

Additionally, the definition of the graphical display object may be quite lengthy. Thus, if a user wants to use multiple graphical display objects, the user must store the multiple definitions which require a large amount of storage space.

SUMMARY OF THE INVENTION

In general, the present invention relates to creating and displaying classes of graphical display objects.

One aspect of the present invention relates to a method for creating a graphical display object for an executable application wherein the graphical display object is based in part on at least one of a plurality of default display objects. The method comprises receiving a definition data structure for an object wherein the definition data structure includes a plurality of display item data about a plurality of corresponding display objects; processing the definition data structure to extract information relating to the plurality of display item data; determining from the extracted information which of the plurality of display objects are default display objects; building default display objects based at least upon default item data wherein the default item data is stored in a plurality of default definition data structures; determining from the extracted information which of the plurality of display objects are custom display objects; building custom display objects based at least upon a portion of the plurality of corresponding display item data; and building a graphical display object based at least upon the default display objects and the custom display objects.

Another aspect of the present invention relates to a method of defining a class of graphical display objects. The method comprises receiving a default definition data structure wherein the default definition data structure includes information about a default graphical display object; receiving a first class member definition data structure related to a first graphical display object wherein the first class member definition data structure includes information about the differences between the default graphical display object and the first graphical display object; and receiving a second class member definition data structure related to a second graphical display object wherein the second class member definition data structure includes information about the differences between the default graphical display object and the second graphical display object.

Another aspect of the present invention relates to a method for defining a plurality of related display configurations for a computer program which is capable of reading display configurations from a file, wherein the plurality of related display configurations define which graphical elements will appear in the display configuration, where the graphical elements should appear within the display, and functional information for the graphical elements. The method comprises receiving a selection of a group of related display configurations; determining which elements are common to more than one of the display configurations selected; and preparing a display configuration family definition wherein the display configuration family definition includes default values for common elements and configuration specific values.

Another aspect of the present invention relates to a method of defining a class of graphical display objects. The method comprises means for receiving a default definition data structure wherein the default definition data structure includes information about a default graphical display object; means for receiving a first class member definition data structure related to a first graphical display object wherein the first class member definition data structure includes information about the differences between the default graphical display object and the first graphical display object; and means for receiving a second class member definition data structure related to a second graphical display object wherein the second class member definition data structure includes information about the differences between the default graphical display object and the second graphical display object.

Another aspect of the present invention relates to a system for creating a class of graphical display objects. The system comprises a default class definition module configured to receive a default class definition of a graphical display object; a class member module configured to receive a first class member definition of a first graphical display object related to the default class definition; and the class member module further configured to receive a second class member definition of a second graphical display object related to the default class definition and different from the first class member definition.

Another aspect of the present invention relates to a system for building a graphical display object. The system comprises a class definition module configured to receive a default class definition and first class member definition; a definition extraction module configured to extract information relating to a graphical display object from the first class member definition and to extract information relating to the graphical display object from the default class definition; and a graphical object builder module configured to build the graphical display object based at least upon the extracted information from the first class member definition and the extracted information from the default class definition wherein the extracted information from the first class member definition overrides at least a portion of the extracted information from the default class definition.

Another aspect of the present invention relates to a graphical display object system for building graphical display objects. The graphical display object system comprises means for receiving class definitions including a default class definition and first class member definition; means for extracting information relating to a graphical display object from the first class member definition and the default class definition; and means for building a graphical display object based at least upon extracted information from the first class member definition and the default class definition wherein the extracted information from the first class member definition overrides at least a portion of the extracted information from the default class definition.

For purposes of summarizing the invention, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

FIG. 2 illustrates a sample definition of three graphical display objects.

FIG. 3 illustrates a sample definition of a class of three graphical display objects.

DETAILED DESCRIPTION

Figure 1A:
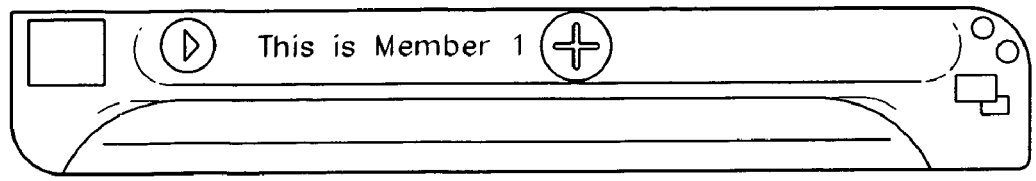
FIG. 1a illustrates an example graphical display object of the RealJukebox® program.

A system and method which represent one embodiment and example application of the invention will now be described with reference to the drawings. Variations to the system and method which represent other embodiments will also be described. In one disclosed embodiment, the system and method are used to create and display classes of graphical display objects. It will be recognized that a variety of data structures may be used to store the graphical display object information.

For purposes of illustration, one embodiment will be described in the context of classes of graphical display objects for an audio music playing device. The inventors contemplate that the present invention is not limited by the type of graphical display object or the type of program for which the graphical display objects are created, and that the types of programs may include any program, such as, for example, a telephone program, a video player program, a calculator program, and a game program. The figures and descriptions, however, relate to an embodiment of the invention wherein the graphical display object is a Skin created for the RealJukebox® program. Furthermore, it is recognized that in other embodiments, the system and method for creating and displaying classes of graphical display objects may be implemented as a single module and/or implemented in conjunction with a variety of other modules and the like. Moreover, the specific implementations described herein are set forth in order to illustrate, and not to limit, the invention. The scope of the invention is defined by the claims.

These and other features will now be described with reference to the drawings summarized above. The drawings and the associated descriptions are provided to illustrate embodiments of the invention, and not to limit the scope of the invention. Throughout the drawings, reference numbers may be re-used to indicate correspondence between referenced elements. In addition, the first digit of each reference number indicates the figure in which the element first appears.

I. Overview

In the graphical display object system, a user can create a class of graphical display objects such that the various members of the class may share common features. In addition, the graphical display object system builds the graphical display objects based upon the common class definitions as well as the custom features of the graphical display object.

One benefit of this embodiment is that the user can create a class of graphical display objects by creating a file that includes common or default values. For the individual class members, the user can define the nondefault values without having to include default values assisting the user in avoiding repetitious work. This saves the user time and effort in creating graphical display objects.

Another benefit of this embodiment is that others can create additional members to existing classes of graphical display objects. For example, a user may add an additional member to the class such that the control buttons of the graphical display object are in a different location than the default definition and the control buttons are two sizes larger than the default definition, but yet the other features are based on the default definition. The user may use, one or more default definitions to help build his graphical display object. This benefit saves users time and effort when creating graphical display objects allowing them to build from existing classes of graphical display objects and use the definitions of others.

An additional benefit of this embodiment is that the amount of storage space for storing the graphical display object definitions is reduced. Because the default definitions are stored in a single location and not duplicated for each class member, the storage space required for a class of graphical display objects is less than the storage space required for a set of independent graphical display objects.

II. Sample Class of Graphical Display Objects

Figure 1B:
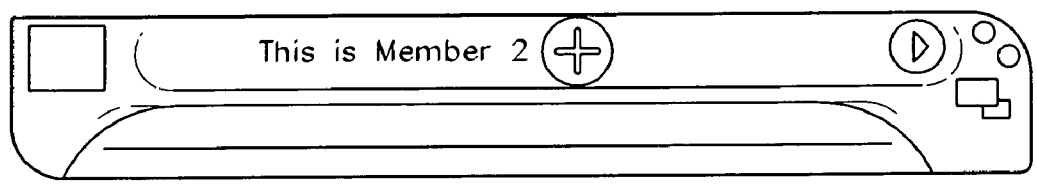
FIG. 1b illustrates an additional example graphical display object of the RealJukebox® program.
Figure 1C:
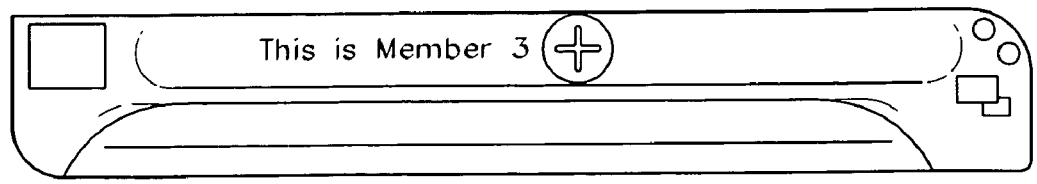
FIG. 1c illustrates an additional example graphical display object of the RealJukebox® program.

FIGS. 1a, 1b, and 1c illustrate three graphical display objects known as Skins for the RealJukebox® program. The graphical display objects vary slightly from each other in that the graphical display object in FIG. 1a shows the Play button near the left edge and is entitled "Member 1"; the graphical display object in FIG. 1b shows the Play button near the right edge and is entitled "Member 2"; the graphical display object in FIG. 1c hides the Play button and is entitled "Member 3".

FIG. 2 illustrates the definitions of the graphical display objects of FIGS. 1a, 1b, and 1c wherein each graphical display object is independent of the other graphical display objects. As shown in FIG. 2, a large portion of the information is the same, requiring duplicative effort by the creator and extra storage space by the system.

FIG. 3 illustrates the definitions of the graphical display objects of FIGS. 1a, 1b and 1c wherein the graphical display objects are members of the same class of objects. Default and/or common values to the class are located under the heading "MAIN," and the custom values for each individual graphical display object are located under the name of the graphical display object. For example, "Sample Skin 1" uses the default values of the class for all of the values except for "Play Top Left" and "Control2Image."

The graphical display object definitions in FIGS. 2 and 3 represent sample definition structures and are meant for illustrative purposes only and are not meant to limit the scope of the invention. For example, a different format for the definition structure could be used and/or the definition structure could be stored in a variety of formats, such as, for example, a single file, a set of multiple files, a linked list, and/or a tree, as is well known to one skilled in the art. In addition, a graphical display object may be related to more than one default definition. For example, a graphical display object may be related to default definitions from multiple parents and/or default definitions form multiple generations of parents (e.g., parent, grandparent, great-grandparent, etc.).

III. Graphical Display Object System

Figure 4:
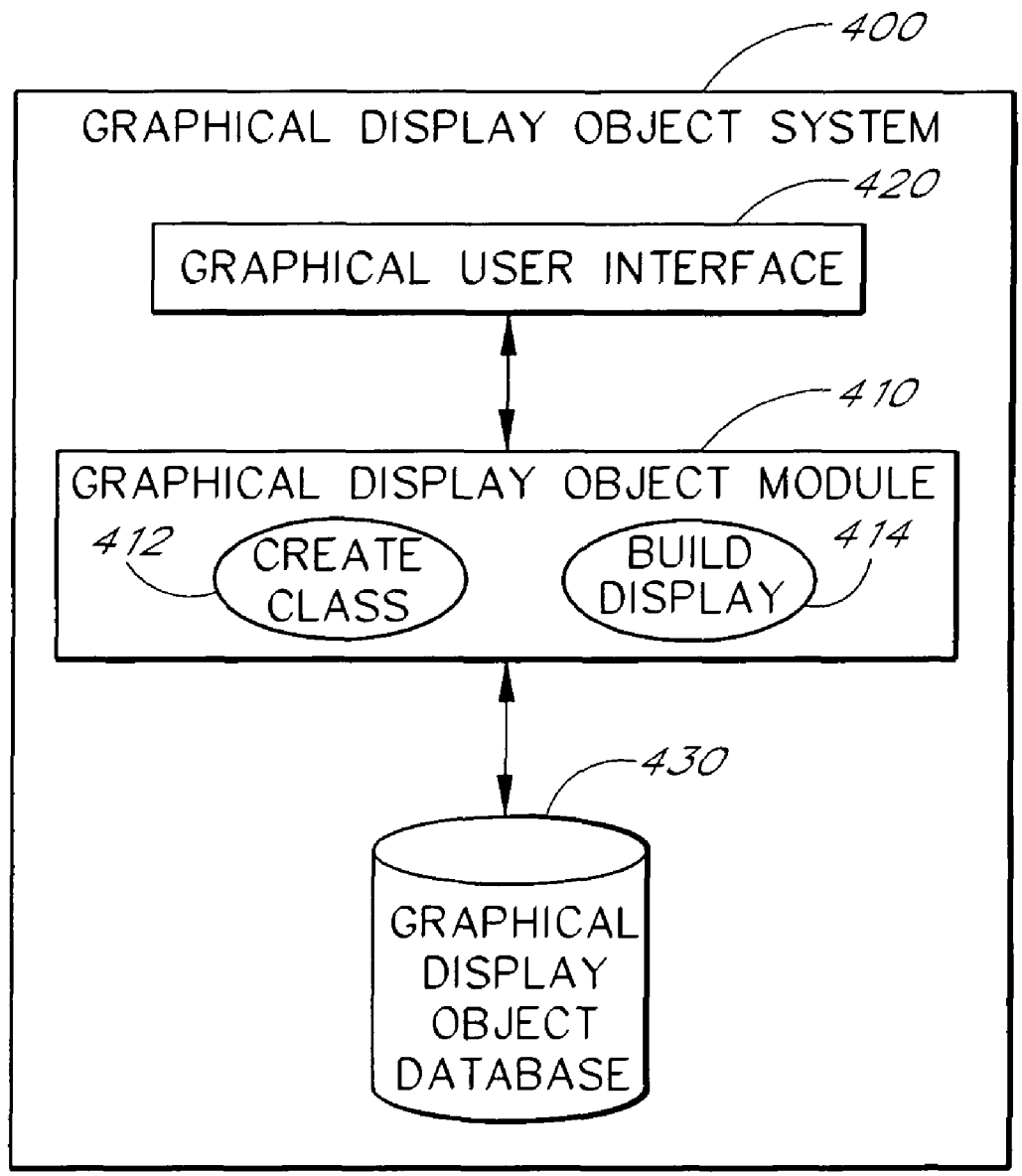
FIG. 4 illustrates a high-level block diagram of one embodiment of the present invention.

FIG. 4 represents an overview of one embodiment of a graphical display object system 400. In one embodiment, the graphical display object system 400 allows users to create classes of graphical display objects and presents the graphical display objects to the user.

In FIG. 4, the graphical display object system 400 includes a graphical display object module 410 that communicates with a graphical user interface 420 and a graphical display object database 430. The graphical display object module 410 includes a create graphical display object class process 412 and a build display process 414.

As used herein, the word module, whether in upper or lower case letters, refers to logic embodied in hardware or firmware, or to a collection of software instructions, advantageously having entry and exit points, written in a programming language, such as, for example, C++. A software module may be compiled and linked into an executable program, or installed in a dynamic link library, or may be written in an interpretive language such as BASIC. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

In one embodiment, the graphical display object system 400 is implemented on a user computer (not shown). The user computer is a device which allows a user to access the graphical display objects. While the term user computer is used, it is recognized that in other embodiments, the graphical display object system 400 may be implemented on other systems such as, for example, a portable computing device, a portable audio player, a portable video player, a server, a computer workstation, a local area network of individual computers, an interactive television, an interactive kiosk, a personal digital assistant, an interactive wireless communications device, a handheld computer, a telephone, a router, a satellite, a smart card, an embedded computing device, or the like.

In one embodiment, the user computer is a conventional, general purpose computer using one or more microprocessors, such as, for example, a Pentium processor, a Pentium II processor, a Pentium Pro processor, an xx86 processor, an 8051 processor, a MIPS processor, a Power PC processor, or an Alpha processor. In one embodiment, the user computer runs an appropriate operating system, such as, for example, Microsoft® Windows® 3.X, Microsoft® Windows 98, Microsoft® Windows® NT, Microsoft® Windows® CE, Palm Pilot OS, Apple® MacOS®, Disk Operating System (DOS), UNIX, Linux®, or IBM® OS/2® operating systems.

In one embodiment, the graphical display object system 400 includes and/or communicates with a program module (not shown). For example, the graphical display object system 400 may communicate with an audio player, a video player, and a calculator such that a user may use a graphical display object of the graphical display object system 400 to access the program module.

A. Graphical Display Object Module

In one embodiment, the graphical display object system 400 includes a graphical display object module 410. As indicated above, the graphical display object module 410 communicates with the graphical user interface 420 and a graphical display object database 430.

The graphical display object module 410 works with the graphical user interface 420 to allow the user to create graphical display objects and to present graphical display objects to the user.

In one embodiment, the graphical display object module 410 includes a create graphical display object class process 412 and a build display process 414.

1. Create Graphical Display Object Class Process

The create graphical display object class process 412 is used to create a class of graphical display objects including a set of default or common class values as well as class members that may include custom and/or nondefault values.

Figure 5:
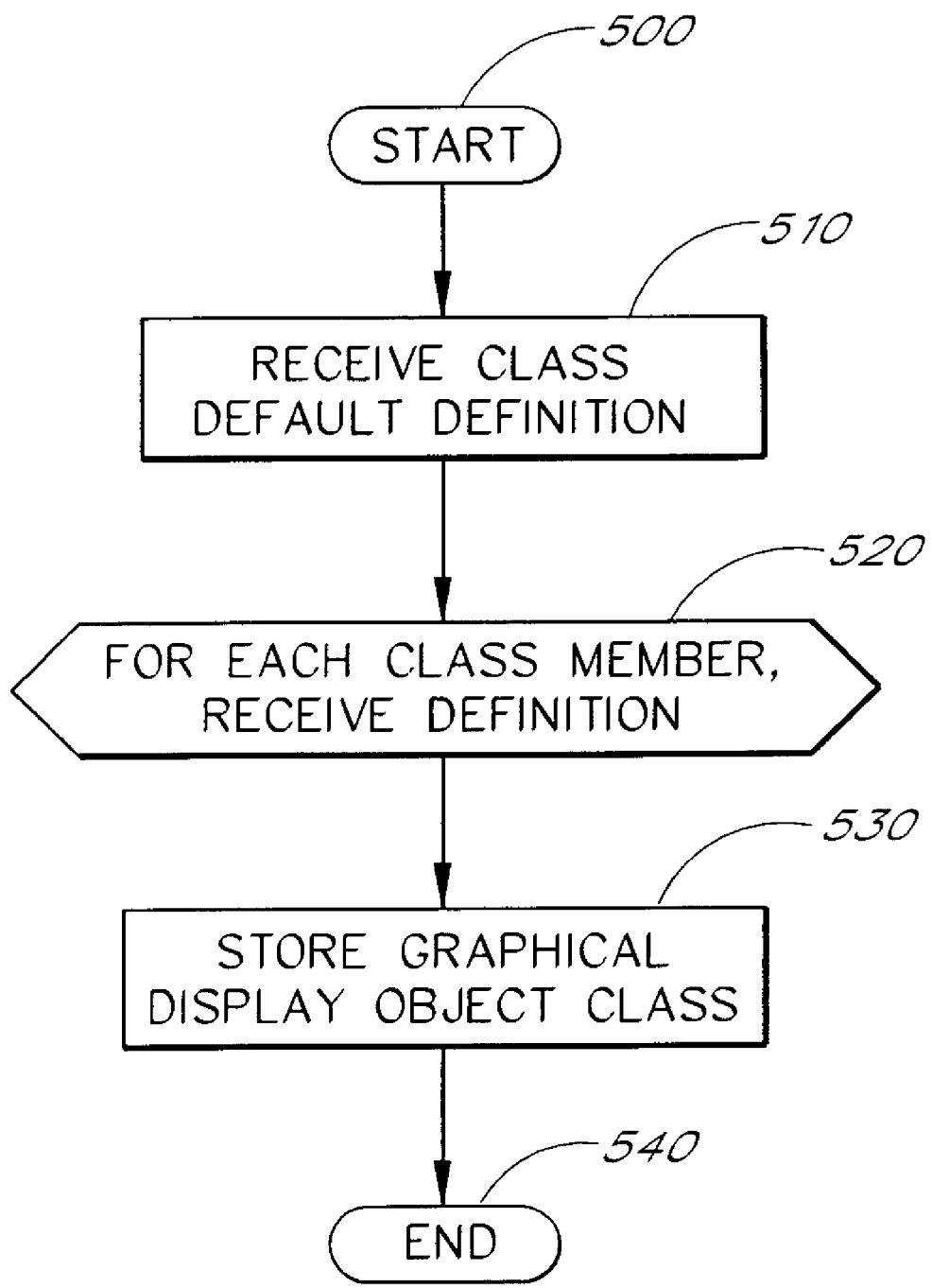
FIG. 5 illustrates a flowchart of one embodiment of creating a class of graphical display objects.

One embodiment of a create graphical display object class process ("create class process") 412 is shown in FIG. 5. Beginning at a start state 500, the create class process 412 proceeds to a state 510. In state 510, the create class process 412 receives a class default definition and proceeds to a state 520. In one embodiment, a user may manually type in the class default definition wherein in another embodiment, a user may also utilize a graphical user interface program to create the class default definition, such as, for example, by dragging and dropping graphics onto a template, such that the definition is generated from the graphical user interface program. In state 520, the create class process 412 receives a definition for each member of the class and proceeds to a state 530. The definition includes information wherein the class member is different from the default definition so as to minimize the user's efforts. As with the class default definition, a variety of methods may be used to extract a definition from the user such as allowing the user to manually type in a definition or using a graphical user interface program to allow the user to define a class member. In state 530, the create class process 412 stores the default definition and the definitions for each class member in the graphical display object database 430 and proceeds to an end state 530.

It is recognized that the create class process 412 may be implemented in a different manner. For example, in one embodiment, the user may create a set of graphical display objects and the graphical display object system 400 may automatically generate the class definition as well as the class member definitions by determining which elements are common to graphical display objects and which elements are not common to the graphical display objects. In another embodiment, the create class process 412 may allow the user to create a class member based on more than one default class definition, using, for example, multiple levels of default classes (e.g., parent, grandparent, etc.).

In one embodiment, the default definition and the definitions for each class member are stored in a single file while it is recognized that they may be stored in a set of files and/or other data structures. It is also recognized that in one embodiment additional information may also be stored in the graphical display object database 430, such as, for example, graphics files used in the graphical display object, non-class based graphical display object definitions, compression algorithms, and program modules.

2. Build Display Process

The build display process 414 is used to build a graphical display object that is a member of a graphical display object class.

Figure 6:
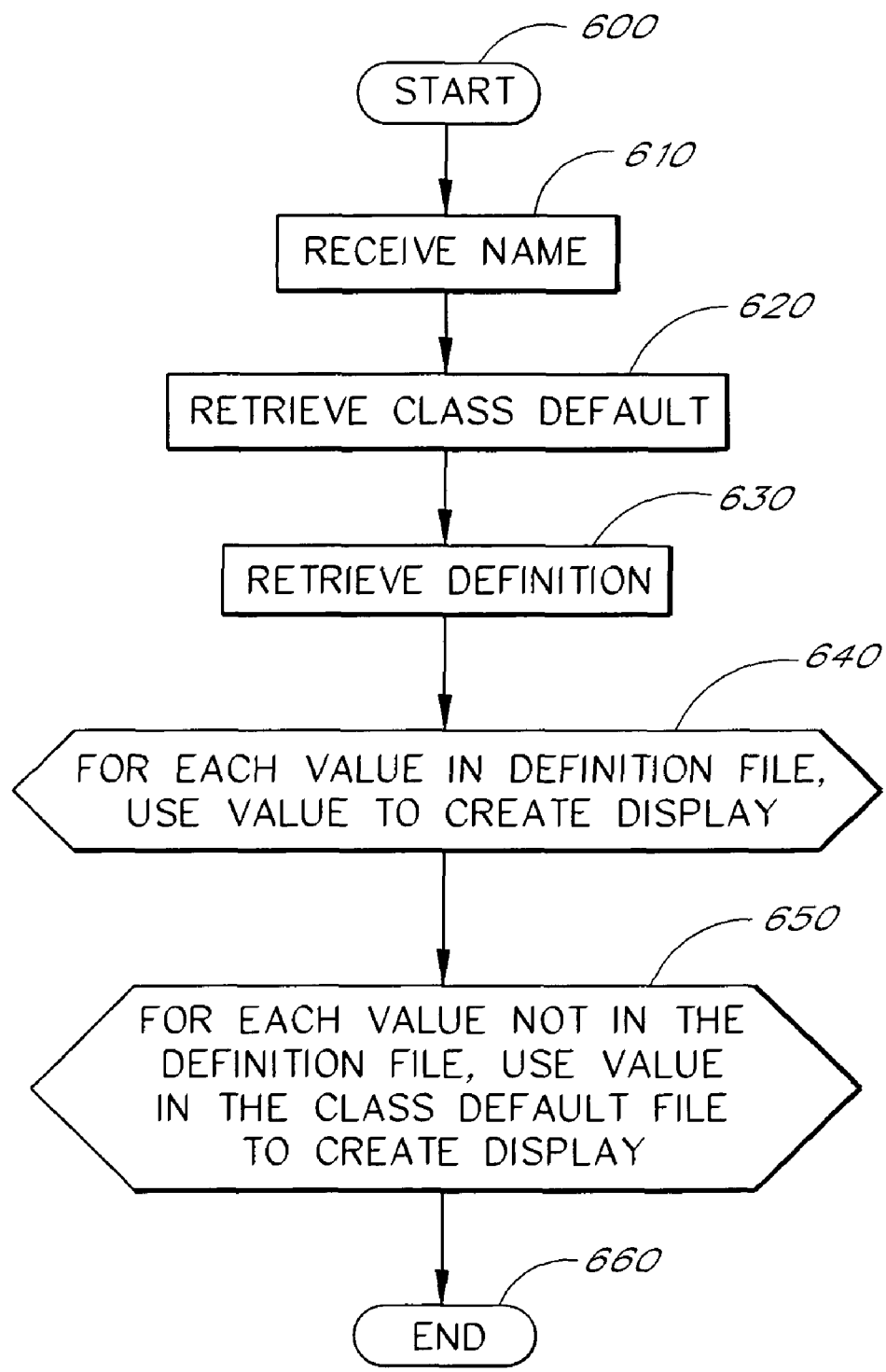
FIG. 6 illustrates a flowchart of one embodiment of building a display of a graphical display object.

One embodiment of a build display process 414 is shown in FIG. 6. Beginning at a start state 600, the build display process 414 proceeds to a state 610. In state 610, the build display process 414 receives the name of the graphical display object to be built and proceeds to a state 620, though it is recognized that the graphical display object may be identified in a different manner, such as by a manually entered ID, an automatically generated ID, a icon, and a sound. In state 620, the build display process 414 retrieves the class default definition related to the graphical display object from the graphical display object database 430 and proceeds to a state 630. In state 630, the build display process 414 retrieves the graphical display object's definition from the graphical display object database 430 and proceeds to a state 640. In state 640, the build display process 414 uses the values in the graphical display object's definition to create and/or populate the display for each value in the definition and proceeds to a state 650. In state 650, the build display process 414 uses the default values to create and/or populate the display for each value not in the graphical display object definition and proceeds to an end state 660.

It is recognized that the build display process 414 may be implemented in a different manner. For example, the graphical display object definition may be retrieved before or with the class default definition or the default graphical display object could be built first and then overridden with the graphical display object's values.

The graphical display object module 410 may include other processes (not shown) such as, for example, a process for compiling a graphical display object class definitions, and/or a process for revising a graphical display object class.

B. Graphical User Interface

In one embodiment, the graphical display object system 400 includes a graphical user interface 420 ("GUI"). The GUI 420 in FIG. 4 presents graphical display objects to the user. The GUI 420 may also allow the user to create classes of graphical display objects.

The GUI 420 may be implemented as a module that uses text, graphics, audio, video, and other media to present data and to allow interaction with the graphical display objects. The GUI 420 may be implemented as a combination of an all points addressable display such as a cathode-ray tube (CRT), a liquid crystal display (LCD), a plasma display, or other types and/or combinations of displays; input devices such as, for example, a mouse, a trackball, a touch screen, a pen, a keyboard, and/or a voice recognition module; and software with the appropriate interfaces which allow a user to access data through the use of stylized screen elements such as, for example, menus, windows, dialog boxes, toolbars, and/or controls (e.g., radio buttons, check boxes, sliding scales, etc.).

C. Graphical Display Object Database

In one embodiment, the graphical display object database 430 stores information about the classes of graphical display objects. This information may include the members of a class, the default definitions for a class, as well as definitions of class members. For example, the graphical display object database 430 may include information about the SampleSkin class as illustrated in FIG. 3.

The graphical display object database 430 may work with other databases (not shown) for performing various tasks. For example, the graphical display object database 430 may communicate with a graphics database, a program module database, a metadata database, and a metadata organization database.

In connection with the graphical display object database 430, in one embodiment, there may be several processes (not shown) such as ID generators, number generators, statistics generators, session generators, and temporary storage units that work with the graphical display object database 430.

In one embodiment, the graphical display object database 430 is implemented using a flat file structure. It is recognized, however, that the graphical display object database 430 may be implemented using other types of databases such as, for example, a relational database, an entity-relationship database, an object-oriented database, and/or a record-based database.

Moreover, while the graphical display object database 430 depicted in FIG. 4 is comprised of a single database, it is recognized that in other embodiments, the graphical display object database 430 may be implemented as a set of databases. In addition, the graphical display object database 430 may be implemented with a single table, a set of multiple tables, or with other data structures that are well know in the art such as linked lists, binary trees, or directed graphs.

IV. Conclusion

While certain embodiments of the invention have been described, these embodiments have been presented by way of example only, and are not intended to limit the scope of the present invention. Accordingly, the breadth and scope of the present invention should be defined in accordance with the following claims and their equivalents.

What is claimed is:

1. An apparatus comprising:
 a storage medium having stored thereon a plurality of programming instructions designed to enable a media player of the apparatus to
  receive an identifier of a graphical display object,
  retrieve default definition data of a class related to the graphical display object, the class default definition data having default values for a first plurality of elements of the graphical display object,
  retrieve custom definition data related to the graphical display object, the custom definition data having custom values for a second plurality of elements of the graphical display object, one or more of the first and second elements being the same elements,
  build the graphical display object based first, on the custom values of the second plurality of elements and then, on the default values of the first plurality of elements that are not included among the second plurality of elements; and
 a processor communicatively coupled to the storage medium to execute the programming instructions.

2. The apparatus of claim 1, wherein the graphical display object relates to a graphical user interface object.

3. The apparatus of claim 2, wherein the graphical user interface object includes one or more selected from the group consisting of buttons, windows, menus, and touch sensitive screens.

4. The apparatus of claim 1, wherein the media player is an audio player.

5. The apparatus of claim 1, wherein the apparatus is a selected system one from the group consisting of a portable computing device, a portable audio player, a portable video player, a server, a computer workstation, a local area network of individual computers, an interactive television, an interactive kiosk, a personal digital assistant, an interactive wireless communication device, a handheld computer, a telephone, a router, a satellite, a smart card, and an embedded computing device.

6. A method comprising:
receiving by a media player operating on an electronic device, an identifier of a graphical display object;
retrieving by the media player, default definition data of a class related to the graphical display object, the class default definition data having default values for a first plurality of elements of the graphical display object;
retrieving by the media player, custom definition data related to the graphical display object, the custom definition data having custom values for a second plurality of elements of the graphical display object, one or more of the first and second elements being the same elements; and
building by the media player, the graphical display object based first, on the custom values of the second plurality of elements and then, on the default values of the first plurality of elements that are not included among the second plurality of elements.

7. The method of claim 6, wherein the graphical display object relates to a graphical user interface object.

8. The method of claim 7, wherein the graphical user interface object includes one or more selected from the group consisting of buttons, windows, menus, and touch sensitive screens.

9. The method of claim 6, wherein the media player is an audio player.

* * * * *